United States Patent Office 3,349,007
Patented Oct. 24, 1967

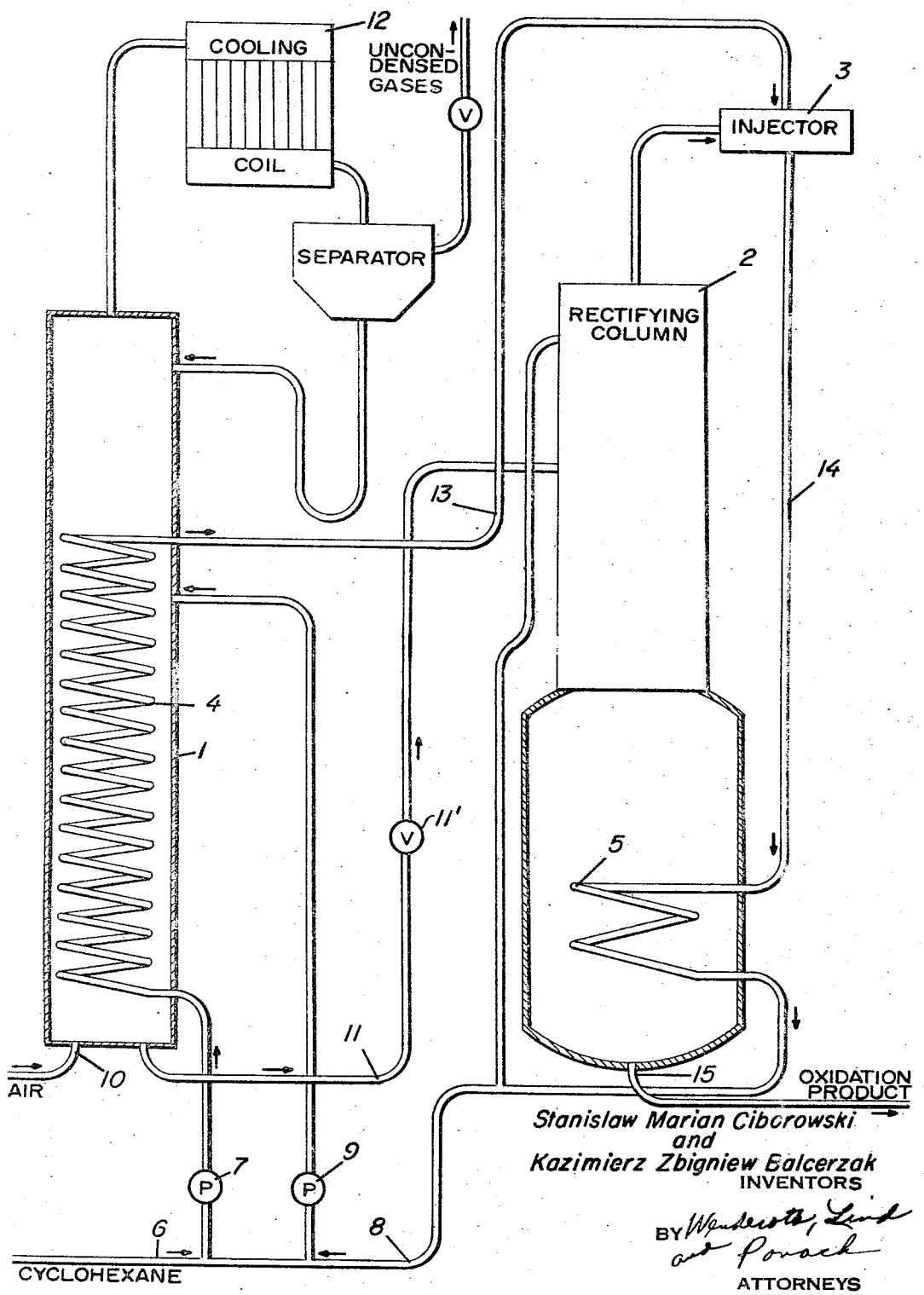

3,349,007
DISTILLATION PROCESS FOR RECOVERY OF OXIDATION PRODUCT OF CYCLOHEXANE
Stanislaw Marian Ciborowski and Kazimierz Zbigniew Balcerzak, Warsaw, Poland, assignors to Instytut Chemii Ogolnej, Warsaw, Poland
Filed Mar. 27, 1964, Ser. No. 355,297
Claims priority, application Poland, Mar. 30, 1963, P 101,183
3 Claims. (Cl. 203—26)

The problem of distilling off chemical substances is, in the chemical industry, of particularly great importance in the case of processes in which the substrate is only partly reacted and must be distilled off from the post-reaction mixture and returned to the process. This question is particularly acute in hydrocarbon oxidation in the liquid phase with gases containing molecular oxygen, e.g. in cyclohexane oxidation to cyclohexanol and cyclohexanone. In this process, the larger the yield of the said products, the smaller is cyclohexane content. On the other hand, however, with an unduly small cyclohexane conversion, thermal energy consumption for distilling off the unreacted cyclohexane is high, so that the cost of this energy exceeds advantages resulting from a bigger yield. With a cyclohexane conversion of 5% per 1 ton of oxidized cyclohexane, at least 30 tons of cyclohexane should be distilled off (taking into account the reflux).

There exist known methods of distilling off chemical substances in an economical manner, but these methods still have several disadvantages. For instance in case of multiple-effect evaporators the difference of temperatures and pressures between the first and the last stage is great, which makes impossible the use of these apparatuses in some processes. There are also known methods consisting of compressing vapours of distilled off substances by means of an injector using high pressure steam, and a subsequent vapour condensation in the heating coil in the container of the distillation column. As a result of the vapours compression, the heat of their condensation can be utilized for evaporating the distilled liquid. A disadvantage of this method is that together with vapours of the distilled liquid, steam is being condensed and the water produced should be subsequently separated from the distilled chemical substance. This requires additional operations and generally involves losses of the distilled substances in the water taken off the system.

The method according to the present invention has none of the above-mentioned disadvantages. The essence of the method consists in that vapours of the distilled substance are compressed by means of an injector fed by compressed vapours of the same substance and subsequently condensed in the heating coil of the distilling container. By this procedures it is not necessary to separate the condensate obtained by liquefaction of vapours, which at the same time makes it possible to avoid losses connected with this operation. Vapours of a given substance of a suitable pressure are obtained by evaporating the liquid under this pressure at a temperature corresponding to this pressure. The operation may be carried on in a vaporizer heated externally by steam of a suitable pressure. It is possible in some cases to utilize the heat of the chemical process by distilling off a given chemical substance in a cooling coil of the tank, in which the exothermic reaction occurs.

The accompanying figure of drawing represents a schematic diagram of a part of the plant for cyclohexane oxidation in liquid phase with gases containing oxygen, in which the method according to the present invention is applied.

Heated, circulating cyclohexane is passed into the oxidation apparatus 1 through the conduit 8 by means of a pump 9, and at the bottom of the apparatus 1 air is supplied via the conduit 10. The oxidation raw product from the apparatus 1, after reducing the pressure by means of pressure reducing valve 11′, is led by the conduit 11 to the rectifying column 2 serving for distilling off cyclohexane.

Vapours and gases produced during the oxidation process are cooled in the cooling coil 12, and the liquefied distillate is separated from the uncondensed gases and returned to the apparatus 1 and after reducing pressure the uncondensed gases are removed out of the system. The cyclohexane vapours leaving the rectifying column 2 are compressed in the injector 3 by means of cyclohexane vapours from the cooling coil 4 of the apparatus, with fresh cyclohexane being supplied by means of the conduit 6 and pump 7. These vapours are led into the injector 3 by the conduit 13. The pressure of these vapours is about 7 atm. The compressed distillate vapours from the rectifying column 2 are led by the conduit 14 to the heating coil 5 of the rectifying column container 2. In the heating coil 5 they are condensed and the released heat of condensation causes distilling of the liquid in the container.

The condensate from the coil 5 is partly returned by the conduit 8 to the top of the rectifying column 2 as a reflux, and it is partly put into the cooling system of the oxidation apparatus 1 through conduit 8, and the rest is led into the oxidation apparatus, where the oxidation reaction occurs. The circulating cyclohexane is replenished with fresh cyclohexane through conduit 6. From the container of the rectifying column 2 the concentrated oxidation product is led off by the conduit 15 and subjected to further processing. In the container of column 2 it is possible to maintain atmospheric pressure, or a pressure lower or higher than that. The optimum pressure depends on the extent to which cyclohexane has been distilled off and on the composition of the liquid drawn from the container. With too low a pressure the temperature may be too low and in the container by products may crystallize e.g. dicarboxylic acids.

The method according to the present invention may be also applied with various changes. Thus it is possible to wash off with water some compounds e.g. dicarboxylic acids from the reaction raw product before its concentration. The cyclohexane vapours may be produced not in the cooling coil of the tank, but in a separate apparatus. In the rectifying column cyclohexane may be distilled off with steam, yet by the application of the cyclohexane vapours produced in the cooling coil of the tank for injector feeding it is possible to obtain a higher degree of compression of vapours leaving the rectifying column, because at a given temperature of the oxidation reaction the cyclohexane vapour pressure is higher than that of the steam, thus the injector may be fed with vapours of a higher pressure. Although cyclohexane has a molecular weight greater than that of water, yet it also has a much smaller heat of vaporization. By evaporating cyclohexane in the cooling coil of the tank, it is possible to obtain a larger quantity of vapours and of a higher pressure in comparison with water evaporation.

What we claim is:
1. A method of distilling off unreacted hydrocarbon from a crude reaction mixture obtained from the liquid-phase air oxidation of the hydrocarbon which comprises:
 (a) removing the crude reaction mixture from the oxidation reaction zone in which an exothermic reaction occurs and forwarding said crude reaction mixture to a rectifying column of a still,
 (b) distilling off in the rectifying column the unreacted hydrocarbon from the oxidation reaction products,

(c) compressing at least a portion of the unreacted hydrocarbon vapors taken off from the rectifying column by means of an injector to a pressure higher than that pressure obtaining in the still of the rectifying column,
(d) forwarding the compressed hydrocarbon vapors to a heating coil in the still of the rectifying column,
(e) condensing the hydrocarbon vapors in the heating coil, the heat of condensation being utilized in the vaporization of the unreacted hydrocarbon in the still, the process being further characterized by:
  (1) a portion of the liquid unreacted hydrocarbon condensed in the heating coil is forwarded to a shell cooling system for the oxidation reactor wherein it is vaporized at a pressure higher than that of the hydrocarbon vapor leaving the rectifying column and is then compressed,
  (2) the hydrocarbon vapors produced in the cooling system of the oxidation reactor are used as the driving agent of the injector employed in compressing the hydrocarbon vapors leaving the rectifying column,
  (3) another portion of the liquid unreacted hydrocarbon condensed in the heating coil, together with fresh unreacted hydrocarbon introduced from outside the reaction system, is introduced into the reaction zone of the reactor for oxidizing, and
  (4) the remaining portion of the liquid unreacted hydrocarbon condensed in the heating coil is recycled to the rectifying column as a reflux stream.

2. A method as in claim 1 wherein the hydrocarbon is cyclohexane.

3. A method as in claim 1 wherein the distillation in the rectifying column is achieved with steam and the liquid condensed in the still heating coil is a mixture of unreacted hydrocarbon and water, the said mixture being separated with the water being taken off and only the unreacted hydrocarbon portion being utilized in accordance with the provisos (1), (2), (3) and (4) of claim 1.

References Cited

UNITED STATES PATENTS

| | | | |
|---|---|---|---|
| 849,579 | 4/1907 | Siebel | 203—26 X |
| 2,339,862 | 1/1944 | Kleinschmidt | 203—24 X |
| 2,410,642 | 11/1946 | Farkas et al. | 260—586 |
| 2,825,742 | 3/1958 | Schueller et al. | 260—533 X |
| 3,023,238 | 2/1962 | Chapman et al. | 260—533 |
| 3,091,098 | 5/1963 | Bowers. | |
| 3,109,782 | 11/1963 | Nathan | 203—25 |
| 3,187,066 | 6/1965 | Nathan | 203—26 X |
| 3,214,352 | 10/1965 | Wells | 202—205 X |

FOREIGN PATENTS

| | | |
|---|---|---|
| 3,080 | 1900 | Great Britain. |
| 614,309 | 12/1948 | Great Britain. |
| 737,453 | 9/1955 | Great Britain. |
| 914,510 | 1/1963 | Great Britain. |

NORMAN YUDKOFF, *Primary Examiner.*

F. E. DRUMMOND, *Assistant Examiner.*